United States Patent [19]

Unno et al.

[11] Patent Number: 4,570,386
[45] Date of Patent: Feb. 18, 1986

[54] REGULATING WHEEL DRESSING SYSTEM IN CENTERLESS GRINDER

[75] Inventors: Kunihiko Unno; Toshio Tsujiuchi, both of Kariya; Yasuo Niino, Gamagohri, all of Japan

[73] Assignee: Toyoda Koki Kabushiki Kaisha, Kariya, Japan

[21] Appl. No.: 614,151

[22] Filed: May 25, 1984

[30] Foreign Application Priority Data

Jun. 8, 1983 [JP] Japan .................. 58-102294

[51] Int. Cl.⁴ .............................. B24B 49/18
[52] U.S. Cl. .................. 51/165.71; 51/5 D; 51/103 R; 125/11 R; 125/11 CD
[58] Field of Search ............. 51/5 D, 2 F, 165.87, 51/165.88, 165.71, 165.72, 103 R, 103 WH, 103 TF, 88; 125/11 R, 11 CD

[56] References Cited

U.S. PATENT DOCUMENTS 2,855,729 10/1958 Render .................. 125/11 R
4,274,231 6/1981 Verega .................. 51/5 D Primary Examiner—Harold D. Whitehead
Attorney, Agent, or Firm—Oblon, Fisher, Spivak, McClelland & Maier

[57] ABSTRACT

A regulating wheel dressing system in a centerless grinder, having a dressing tool for dressing a regulating wheel, which dressing tool is adapted to be feed-controlled in a direction parallel to the axis of rotation of the regulating wheel and also in a crossing direction by a feed control means, which in turn is controlled biaxially simultaneously by a control means. Coordinate values of plural points on a rotated hyperboloid of one sheet of revolution to be formed on the regulating wheel are calculated and the dressing tool is feed-controlled for coordinate interpolation between the plural points with those coordinate values as target points. The regulating wheel can be dressed to the rotated hyperboloid of one sheet of revolution in high accuracy independently of changes of its diameter and even where it is stepped for supporting a stepped work.

3 Claims, 6 Drawing Figures

REGULATING WHEEL DRESSING SYSTEM IN CENTERLESS GRINDER

BACKGROUND OF THE INVENTION

1. Field of the Invention

The present invention relates to a regulating wheel dressing system in a centerless grinder.

2. Description of the Prior Art

In centerless grinders, a regulating wheel is contacted with a cylindrical surface of a work throughout the overall length thereof while being slightly inclined relative to the axis of the work, so it is necessary to dress the regulating wheel in the special shape of a rotated hyperboloid of one sheet of revolution. To this end, in conventional centerless grinders, a regulating wheel dressing tool is mounted so as to be movable in a direction inclined at a predetermined angle relative to the axis of a regulating wheel and also in a crossing direction, and the regulating wheel is dressed in the shape of a rotated hyperboloid of one sheet of revolution according to a profiling method using a template which conforms to the work shape.

In such regulating wheel dressing method, it is possible to effect dressing with a relatively high accuracy in a certain diameter of the regulating wheel, but as the regulating wheel diameter changes, there occurs a dressing error, and this error becomes extremely noticeable particularly in the case of a stepped regulating wheel which supports a stepped work. In the conventional method, therefore, the work grinding accuracy encounters a limit, so where a high grinding accuracy is required, it is necessary to readjust the positional relationship between the regulating wheel and the dressing tool according to changes of the regulating wheel diameter.

SUMMARY OF THE INVENTION

It is the object of the present invention to provide a regulating wheel dressing system capable of dressing a regulating wheel in the shape of a rotated hyperboloid of one sheet of revolution in high accuracy independently of changes of the regulating wheel diameter.

In a centerless grinder to which is applied the present invention, a work is supported rotatably by a regulating wheel and a work blade and is ground by a grinding wheel. The axis of rotation of the regulating wheel is slightly inclined relative to the axis of the work. The regulating wheel dressing system of the present invention applied to this type of a centerless grinder includes a dressing tool for dressing a regulating wheel, which dressing tool is mounted so as to be movable in directions parallel to and intersecting the axis of rotation of the regulating wheel and is feed-controlled by a feed control means. In a numerical controller used in the dressing system of the invention there is provided a memory means for storing data representing a throat circle diameter (minimum theoretical diameter) of the regulating wheel, data representing an inclination angle of the regulating wheel, data representing a finish diameter of a work and data representing a center height of the work. In dressing the regulating wheel, the numerical controller calculates coordinate values of plural points on a rotated hyperboloid of one sheet of revolution to be formed on the regulating wheel on the basis of those data, and performs a coordinate interpolation between the plural points according to a simultaneous biaxial pulse distribution control with those coordinate values as target points, whereby the regulating wheel is dressed in the shape of the rotated hyperboloid of one sheet of revolution.

BRIEF DESCRIPTION OF THE ACCOMPANYING DRAWINGS

DETAILED DESCRIPTION OF A PREFERRED EMBODIMENT

Figure 1:
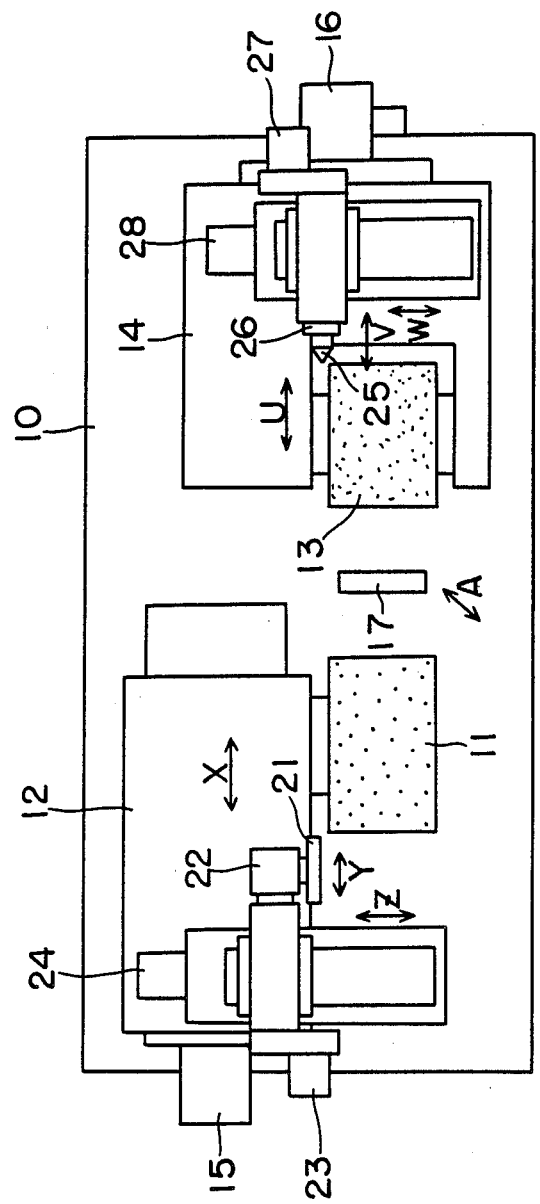
FIG. 1 is a plan view of a centerless grinder.
Figure 4:
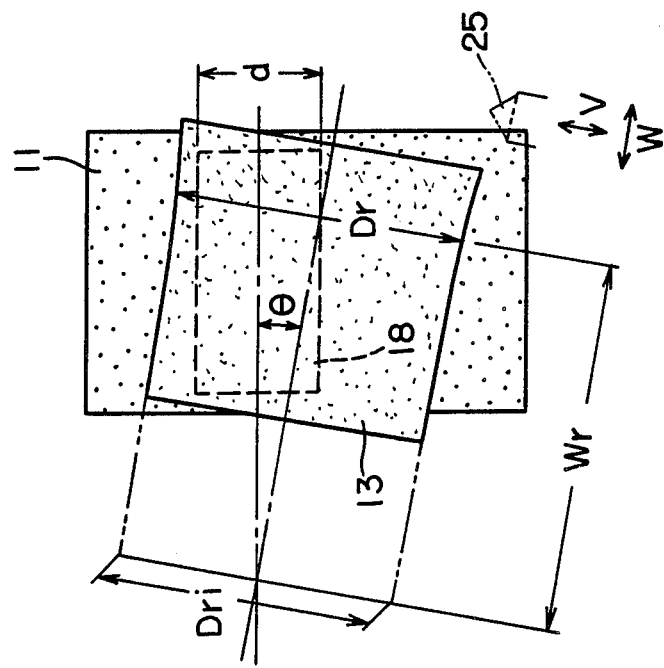
FIGS. 3 and 4 illustrate the relation of a regulating wheel and a grinding wheel to a work.

Referring first to FIG. 1, a wheel head 12 which supports a grinding wheel 11 rotatably through a shaft and a regulating wheel support 14 which supports a regulating wheel 13 rotatably through a shaft are mounted on a bed 10 of a numerically controlled centerless grinder so as to be movable forward and backward opposedly in X and U directions which are parallel to each other. The wheel head 12 and the regulating wheel support 14 are feed-controlled in the X and U directions by means of feed controllers including servomotors 15 and 16 as drive sources. The axis of rotation of the regulating wheel 13 is inclined by a slight angle $\theta$ relative to the axis of a work 18 in a plane parallel to the latter axis (see FIG. 4), and the regulating wheel 13 is in the shape of a rotated hyperboloid of one sheet of revolution. Also mounted on the bed 10 is a work blade 17. The work 18 is supported by the regulating wheel 13 and the work blade 17 and is ground by the grinding wheel 11.

A dressing head 22 which supports a dressing tool 21 for dressing the grinding wheel 11 is mounted on the wheel head 12 so as to be movable in Y direction orthogonal to the axis of the grinding wheel 11, and also in Z direction parallel to the said axis. It is fed for cutting in the Y direction by a predetermined amount by means of a depth of cut controller including a servomotor 23 as a drive source and is traversed in the Z direction by a predetermined amount by means of a feed controller including a servomotor 24 as a drive source. Further, a dressing head 26 which holds a dressing tool 25 for dressing the regulating wheel 13 is mounted on the regulating wheel support 14 so as to be movable in V direction orthogonal to the axis of the regulating wheel 13 and also in W direction parallel to the said axis. The dressing head 26 is controlled in its depth of cut and in its feeding in the V and W directions by means of a depth of cut and feed controller including servomotors 27 and 28 as drive sources. The regulating wheel 13 is dressed in the shape of a rotated hyperboloid of one sheet of revolution by a simultaneous biaxial control for the V and W axes.

Figure 2:
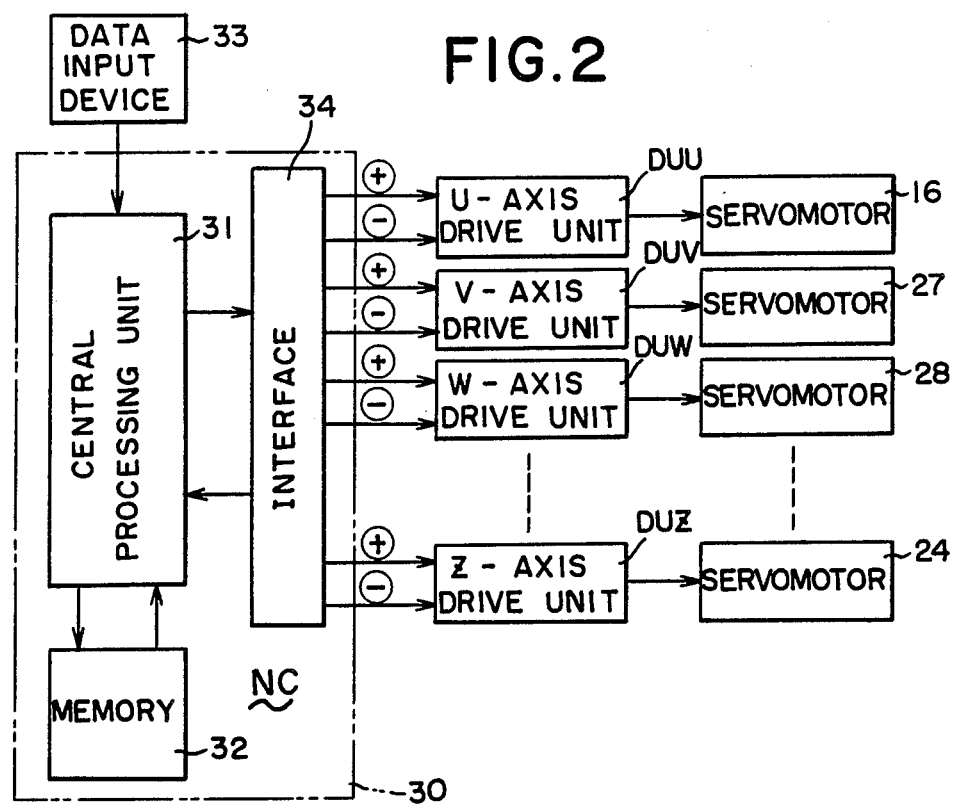
FIG. 2 is a block diagram of a control circuit.

The configuration of a control circuit will now be described with reference to FIG. 2. A central processing unit 31 in a numerical controller 30 comprises a microprocessor. A memory 32, a data input device 33 and an interface 34, are connected to the central processing unit 21, and the 34 are drive units DUU, . . . DUZ for driving the servomotors 15, 16, 23, 24, 27 and 28 are connected to the interface 34.

Figure 3:
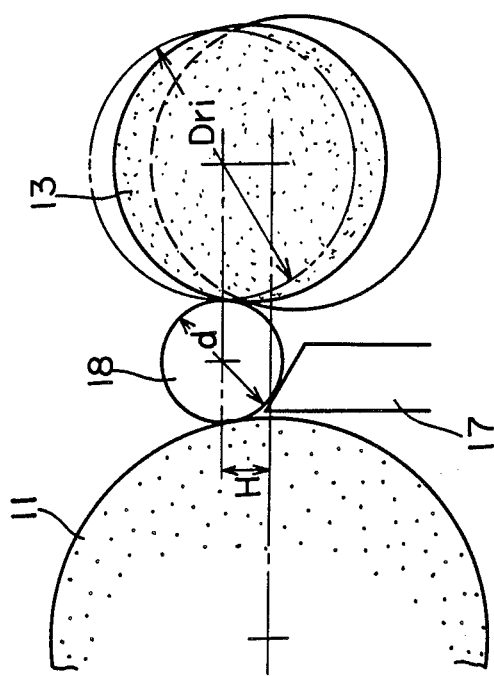

In the memory 32 is provided a numerical control data area which stores numerical control programs for performing the grinding operation for the work 18 and the dressing operation for the grinding wheel 11 and regulating wheel 13. Further, data necessary for executing a dressing program for the regulating wheel 13 such as those shown in FIGS. 3 and 4, namely, data representing the inclination angle $\theta$ of the dressing wheel 13, data representing a throat circle diameter, Dri, of a rotated hyperboloid of one sheet of revolution to be formed on the regulating wheel 13, data representing an axial position, Wr, relative to the throat circle diameter portion, data representing a finish dimension, d, of the work 18, data representing a center height, H, of the work 18 and data representing an interpolation pitch, a, are input to the memory 32 by the data input device 33 and stored in a predetermined memory area.

The flow chart for dressing the regulating wheel 13 into the shape of a rotated hyperboloid of one sheet of revolution will now be explained. From the foregoing data of throat circle diameter Dri, work finish diameter d, axial position Wr, center height H and inclination angle $\theta$, an axial section curve of the regulating wheel 13 is expressed as follows:

$$Dr = Dri \sqrt{1 + \cos^2\theta \cdot m^2} + d \frac{(1 + m^2 - \sqrt{1 + m^2}}{1 + \cos^2\theta \cdot m^2}$$

where $m = (H - Wr\sin\theta) / \left( \frac{d}{2} + \frac{Dri}{2} \cos^2\theta \right)$ From the above equation it is possible to calculate the diameter Dr of the regulating wheel 13 in any axial position Wr, whereby it is made possible to obtain coordinate values on a rotated one-sheet hyperboloid parallel to the regulating wheel axis at a certain throat circle diameter Dri.

Figure 5:
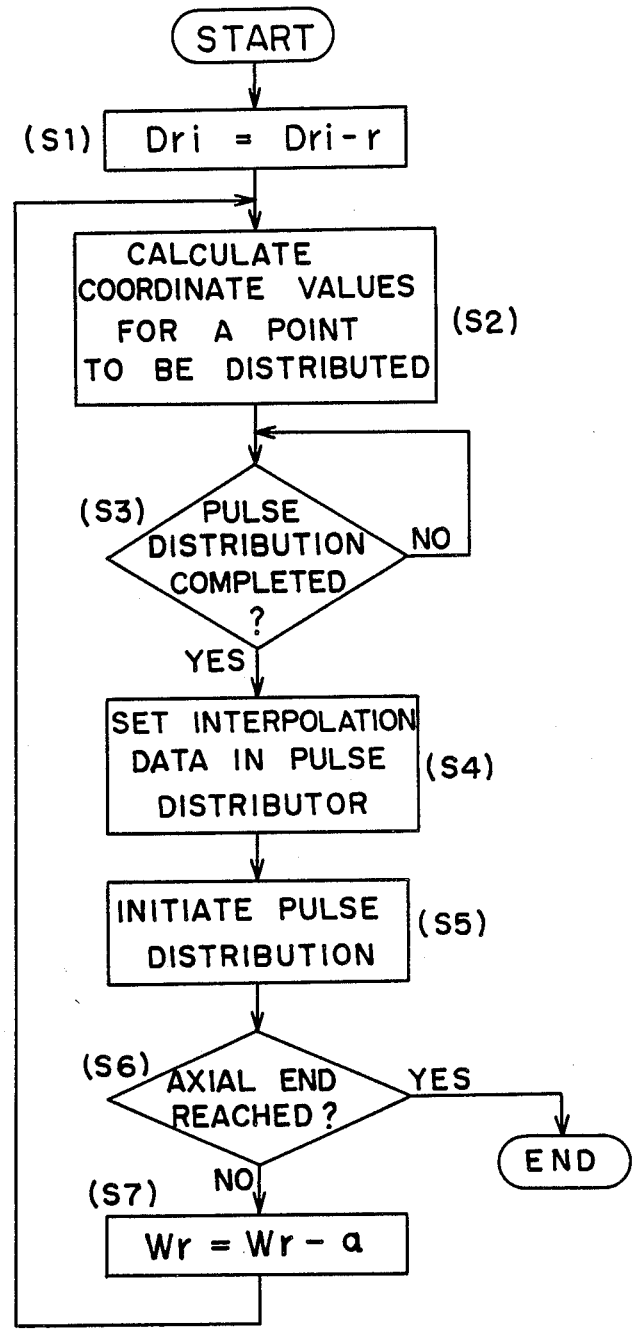
FIG. 5 is a flow chart showing operations of a central processing unit shown in FIG. 2.

Referring now to FIG. 5, S1 to S7 show the various flow chart steps. Upon issuance of command to dress the regulating wheel 13, in a first step S1 a depth of cut, r (see FIG. 6), is subtracted from the throat circle diameter Dri to calculate the throat circle diameter Dri of a rotated hyperboloid of one sheet of revolution to be dressed. Then in step S2, the diameter of the regulating wheel 13 in the axial position Wr is calculated using the foregoing equation to obtain a coordinate value of the first point P0 (FIG. 6) to be interpolated. In step S4, interpolation data including the machining origin of the dressing tool 25 as a start point and the thus-obtained point P0 as an end point are set to a pulse distributor for V and W axes in the numerical controller 30, and in step S5 the drive units DUV and DUW are commanded to start pulse distribution. Then in step S6, whether the axial position Wr has reached a predetermined value or not is judged. If the answer is negative, the interpolation pitch, a, is subtracted from the axial position Wr, then again in step S2 a coordinate value of point P1 to be next interpolated is determined in the same manner as above. Further, in step S3, whether the pulse distribution to the point P0 has been completed or not judged, and if the answer is affirmative, interpolation data including the point P0 as a start point and the point P1 as an end point are set to the pulse distributor in step S4 and the distribution of pulses is started.

Figure 6:
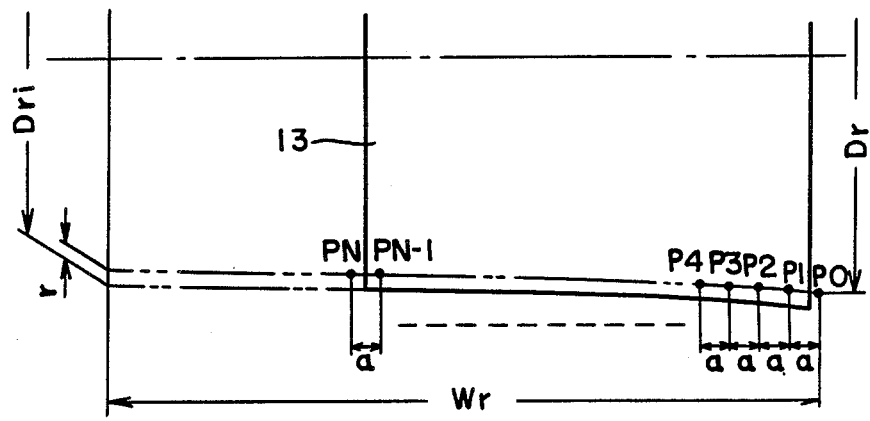
FIG. 6 is an explanatory view of a coordinate interpolation.

In this way, as shown in FIG. 6, coordinate values of plural points P0, P1, ... PN which are axially spaced from each other by the predetermined pitch, a, are successively obtained. At the same time, the two V and W axes are simultaneously controlled for linear interpolation between the points P0, P1 ... PN and the dressing tool is feed-controlled along the rotated hyperboloid of one sheet of revolution to dress the regulating wheel 13 into the predetermined shape.

When the dressing tool 25 has been feed-controlled throughout the overall width of the regulating wheel 13, the result of judgment in step S6 becomes YES and the dressing cycle for the regulating wheel 13 is over. Thereafter, the dressing tool 25 is again returned to the machining origin.

In the case of dressing a stepped regulating wheel which supports a stepped work, data representing a finish diameter in each step of the work and data representing each throat circle diameter of the regulating wheel which contacts a cylindrical surface of each finish diameter are input in advance. And first coordinate values of the points to be interpolated are obtained by substituting one finish diameter of the work and the associated throat circle diameter into the foregoing equation, to dress one surface of the regulating wheel. Then, the remaining surfaces are dressed successively on the basis of finish diameters and throat circle diameters different from the above. Thus, even a stepped regulating wheel can be dressed accurately in the shape of a rotated one-sheet hyperboloid.

Although in the above embodiment the pulse distribution is performed while successively calculating coordinate values of the points to be interpolated, coordinate values of all the points to be interpolated may be calculated in advance of pulse distribution.

According to the present invention, as set forth hereinabove, coordinate values of plural points on a rotated hyperboloid of one sheet of revolution to be formed on a regulating wheel are calculated and a dressing tool is feed-controlled for coordinate interpolation between the plural points with those coordinate values as target points. Consequently, the regulating wheel can be dressed to the rotated hyperboloid of one sheet of revolution in high accuracy independently of changes of the regulating wheel diameter.

What is claimed is:

1. A dressing system for dressing a regulating wheel to the shape of a hyperboloid of one sheet of revolution in a centerless grinder of the type wherein a workpiece to be ground by a grinding wheel is rotatably supported by a regulating wheel and a work blade and the rotational axis of said regulating wheel is inclined at a predetermined angle relative to the axis of said workpiece in a plane parallel to the axis of said workpiece, said dressing system comprising:

a dressing tool mounted on said centerless grinder for movement in a first direction parallel to the axis of said regulating wheel and in a second direction transverse to said first direction;

first and second feed means for respectively moving said dressing tool in said first and second directions;

memory means for storing various data including a throat circle diameter of said hyperboloid of one sheet of revolution, said predetermined angle, a finish diameter of said workpiece, a center height of said workpiece and a dressing tool position in said first direction relative to said regulating wheel;

calculation means for successively calculating based upon said various data being stored in said memory means a plurality of positions to which said dressing tool is to be successively moved for dressing said regulating wheel to said hyperboloid of one sheet of revolution;

feed control means for controlling said first and second feed means to operate simultaneously so as to move said dressing tool along said plurality of positions calculated by said calculation means; and first data rewriting means for rewriting prior to the operation of said calculation means said throat circle diameter being stored in said memory means so that the rewritten throat circle diameter represents an actual throat circle diameter which said regulating wheel after a dressing operation would have.

2. A dressing system as set forth in claim 1, further comprising:

second data rewriting means for rewriting said dressing tool position being stored in said memory means so that the rewritten dressing tool position represents a next position moved in said first direction from a previous position which is indicated by said dressing tool position before such rewriting operation;

said calculation means being operable for calculating one of said plurality of positions each time said dressing tool position being stored in said memory means is rewritten by said second data rewriting means; and said feed control means being operable each time one of said plurality of positions is calculated by said calculation means, for controlling the simultaneous operations of said first and second feed means so as to move said dressing tool to said one of said plurality of positions.

3. A dressing system for dressing a regulating wheel to the shape of a hyperboloid of one sheet of revolution in a centerless grinder of the type wherein a workpiece to be ground by a grinding wheel is rotatably supported by a regulating wheel and a work blade and the rotational axis of said regulating wheel is inclined at a predetermined angle relative to the axis of said workpiece in a plane parallel to the axis of said workpiece, said dressing system comprising:

a dressing tool mounted on said centerless grinder for movement in first direction parallel to the axis of said regulating wheel and in a second direction transverse to said first direction;

first and second feed means for respectively moving said dressing tool in said first and second directions; and a numerical controller connected to said first and second feed means and including:

memory means for storing various data including a throat circle diameter of said hyperboloid of one sheet of revolution, said predetermined angle, a finish diameter of said workpiece, a center height of said workpiece and a desired tool position in said first direction relative to said regulating wheel;

said numerical controller being operable for performing the steps of:

(a) rewriting in response to a dressing command said throat circle diameter being stored in said memory means so that the rewritten throat circle diameter represents an actual throat circle diameter which said regulating wheel after a dressing operation would have;

(b) calculating based upon said various data being stored in said memory means a position to which said dressing tool is to be moved for dressing said regulating wheel to the shape of said hyperboloid of one sheet of revolution;

(c) effecting pulse distribution simultaneously to said first and second feed means so as to move said dressing tool to said position calculated in said step (b);

(d) rewriting said dressing tool position being stored in said memory means by adding a predetermined amount thereto; and (e) repeating said steps (b) and (d) until said regulating wheel is dressed by said dressing tool through its entire axial length.

* * * * *